United States Patent Office 3,654,209
Patented Apr. 4, 1972

3,654,209
PROCESS FOR MANUFACTURING POLYVINYL ESTER DISPERSIONS
Eduard Bergmeister and Erwin Lieb, Burghausen, Upper Bavaria, Christian Schmidtkonz, Pocking, Niederbayern, and Hubert Wiest, Burghausen, Upper Bavaria, Germany, assignors to Wacker-Chemie G.m.b.H., Munich, Bavaria, Germany
No Drawing. Filed May 18, 1970, Ser. No. 38,587
Int. Cl. C08f 15/40
U.S. Cl. 260—29.6 TA                5 Claims

ABSTRACT OF THE DISCLOSURE

Process for manufacturing aqueous, highly viscous and stable polyvinyl ester dispersions with particle sizes from 0.03 to $0.2\mu$ by radical polymerization in the aqueous phase of monomeric vinyl esters of straight-chained or branched carboxylic acids with 2 to 18 carbon atoms, at a temperature of 10 to 100° C., which comprises polymerizing 5 to 25 weight percent of the total monomer quantity in an emulsion solution up to at least 70 weight percent of the conversion of the available monomer, and then adding to said emulsifier solution the remaining monomer quantity and a mixture of 0.1 to 2 weight percent of acryl-, methacryl-, or crotonic acid and also their amides, each time referred to the total weight of the polyvinyl ester dispersion, the said addition to said emulsifier solution being added continuously in such manner that the monomer content of the reaction mixture does not exceed 25 weight percent referred to the reaction mixture.

---

It is customary to use rough-particle (5 to $1\mu$ particle size) highly viscous polyvinyl ester dispersions for paint binding agents. These are produced by radical polymerization of monomers, particularly in the presence of water-soluble polymers which act as protective colloids. Such rough-particle dispersions, however, are not satisfactory with regard to the pigment binding capacity, the gloss formation and waterproof character.

There has been no lack of attempts to use fine-particle polyvinyl ester dispersions (particle size below $0.5\mu$, mainly in the region of 0.3 to $0.05\mu$) as paint binding agents. For producing fine-particle polyvinyl ester dispersions a quantity of various ionogenous and non-ionogenous emulsifiers has been used. The simultaneous polymerization of water-soluble, olefinically unsaturated monomers like for instance acrylic acid, vinyl sulfonate or vinyl pyrrolidone for improving the stability of dispersions is also known.

The fine-particle products made in accordance with the above method have not been successful in practice as paint binding agents because the advantages which could be expected due to the fine character of the dispersion (higher pigment binding capacity, better gloss formation and lower white tarnishing of the binding agent film during water storage) are offset by a number of grave deficiencies. Thus, these dispersions are either incompatible, or at least not compatible in the same way, with various customary pigments and fillers like kaolin, talcum, titanium dioxide, zinc white, china clay or chalk, so that only a specific choice of customary fillers can be used. Moreover, when working in these substances, coagulates are formed which result in rough surfaces when painted on. Also, these paint dispersions thicken in most cases immediately after admixing the fillers or a short time later to such an extent that they are no longer brushed on easily. Also, the fine-particle dispersions are less stable against mechanical stresses like pumping and stirring than large-particle dispersions, and the viscosity of the fine-particle ones is considerably lower than that of the large-particle ones, so that larger quantities of thickening agents must be added to achieve good processing characteristics, particularly good brushability. However, this reduces the resistance to water.

A method is also known (see DAS #1,265,988) for producing mechanically stable and pigment stable polyvinyl ester dispersions. Here one uses an emulsifier system of acrylic acid copolymerizates as a protective colloid, nonionogenous polyalkylene oxides or polyalkylene oxide derivatives and sulphonated long-chained alcohols or sulphonated polyalkylene oxides. Moreover, one can include water-soluble monomers in the polymerization. Dispersions made in this manner have plastic particle sizes of 0.5 to $1\mu$ and can be classed as the types called medium dispersed. Their capacity for taking up pigment and giving gloss is lower than that of fine-particle dispersions. Moreover, the polymer film made from them immediately gets tarnished white when stored in water.

We have now discovered a process for producing aqueous highly viscous and stable polyvinyl ester dispersions with particle sizes from 0.03 to $0.2\mu$ by radical polymerization in the aqueous phase of vinyl esters of straight-chained or branched carboxylic acids with 2 to 18 carbon atoms and in some cases additional ethylenically unsaturated monomers up to a weight percentage of 60%, referred to the total monomer quantity, at a temperature of 10 to 100° C., in the presence of polyalkylene oxides or polyalkylene oxide derivatives with 5 to 50 alkylene oxide units per molecule and perhaps of anionic emulsifiers. The process is characterized by the fact that 5 to 25 weight percent, preferably 8 to 20 weight percent, of the total monomer quantity is polymerized in the presence of the emulsifier solution up to at least 70 weight percent of the inserted monomers and that subsequently the remaining monomers and a mixture of 0.1 to 2 weight percent acryl-, methacryl- or crotonic acid as well as 0.1 to 2 weight percent acryl-, methacryl-, or crotonic acid amide, referred respectively to the total weight of the polyvinyl ester dispersion, are added continuously in such a manner that the monomer content of the reaction mixture does not exceed 25 weight percent, preferably 15 weight percent, referred to the reaction mixture.

Vinyl esters of straight-chained or branched carboxylic acids with 2 to 18 carbon atoms are, for instance, vinyl acetate, vinyl propionate, vinyl butyrate, vinyl octoate, vinyl-2-ethylhexoate, vinyl laurate and vinyl stearate. Also of significance are vinyl esters of α-branched carboxylic acids, e.g. isononane, isotridecane and versatic acids. The vinyl esters may be used singly or in admixture. Moreover, in addition others may be copolymerized up to 60 weight percent, referred to the total quantity of monomers of ethylenic unsaturated monomers. Such monomers are e.g. vinyl fluoride, vinyl chloride, vinylidene chloride, olefines like ethylene or propylene, iso-butene and butene-2, styrol, acrylnitrile or mono- or di-esters of acrylic, methacrylic, fumaric, maleinic, itaconic acid with mono- or di-alcohols with 1 to 18 carbon atoms.

In order to produce polyvinyl ester dispersions whose polymer films have particularly good properties as respects resistance to water and saponification, one or several vinyl esters are polymerized according to the process of the invention in quantities of from 40 to 80% by weight and 20 to 60% by weight of vinyl chloride or 30 to 80% by weight of vinyl ester, 10 to 40% by weight of vinyl chloride and 5 to 30% by weight of ethylene, each time referred to the total quantity of monomers.

Furthermore it is advantageous when alkali salts of vinyl sulfonic acid are polymerized up to a quantity of 1% by weight referred to the polyvinyl ester dispersion. Here the vinyl sulfonate can be presented in its entirety in the emulsifier solution, or it can be dosaged in its entirety together with the monomer input, or its quantity may be divided into such presentation and dosaging.

For polyalkylene oxide one can use block or copolymerizates of ethylene oxide and of propylene oxide with 4 to 50 alkylene oxide units per molecule. Also suitable are polyalkylene oxide derivatives with equal chain length of alkyl phenols, like nonylphenolpolyglycol ether, isopropylphenolpolyglycol ether or of fatty alcohols, e.g. lauryl-, isotridecyl- or oleyl alcohols or of carboxylic acids, carboxylic acid amides or primary and secondary amines. Here quantities of 0.5 to 5% by weight, preferably 0.5 to 3% by weight, referred to the polyvinyl ester dispersion, are used. Mixtures of these emulsifiers are also used. Occasionally anionic emulsifiers are also used, like for instance sulfosuccinic acid dialkyl ester with 9 to 20 carbon atoms per alkyl residue, alkylarylmono- or -disulfonates like for instance tetrapropylenebenzene sulfonate, primary or secondary sulfonates or alkanes with 9 to 18 carbon atoms, for instance the commercially available mersolates and alkyl sulfates. Here, too, one or several emulsifiers can be added. The quantities used are between 0.5 and 2% by weight, preferably 0.05 and 1% by weight. It is an advantage of the process of the invention that no protective colloid must be added to the emulsifiers.

For polymerization catalysts all catalysts used for emulsion polymerization are suitable. These are principally water-soluble radical formers like hydrogen peroxides, sodium-, potassium- and ammonium persulfate as well as tert. butylhydroperoxide. The radical components can be used singly or together with reduction agents like formaldehyde sodium sulfoxylate, iron-II-salts, sodium dithionite, sodium hydrogen sulfite, sodium thiosulfate as redox catalyst systems. Also well suitable is the redox catalyst system described in DBP #1,133,130, consisting of precious metals of the VIII Group of the Periodic System, inorganic or organic peroxides, hydrogen as reduction agent and sometimes heavy metal ions.

The radical components and sometimes the reduction agents which are used in the usual quantities, preferably 0.01 to 1% by weight, referred to the total weight of the monomers used, can be applied with aqueous emulsifiers or they can also be dosaged during the polymerization.

During the polymerization the usual buffer salts like alkali acetates, alkali carbonates, alkali phosphates as well as polymerization regulators like mercaptane, aldehydes, chloroform, methylene chloride and trichloroethylene can also be added.

The process of the invention is carried out as follows: 5 to 25, preferably 8 to 20% by weight, of the monomers are placed into the aqueous emulsifiers and then they are polymerized out up to a conversion of at least 70% by weight of the monomer used. Subsequently the remaining quantities of the monomers and a mixture, consisting of the water-soluble components (a) 0.1 to 2% by weight acrylic acid, methacrylic acid or crotonic acid, and (b) 0.1 to 2% by weight acryl-, methacryl- or crotonic acid amide, each time referred to the total polyvinyl ester dispersion, are added in dosages. Here the quantity of the compounds (a) and (b) should not exceed 3% by weight. The remaining monomers can be added separate from or together with the water-soluble components. However, the monomer contents of the reaction mixture during the polymerization must not exceed 25% by weight, preferably 15% by weight, referred to the reaction mixture. The dosage speed for the monomers and/or the catalyst solution is adjusted in accordance with the above conditions. After the addition is completed, the polymerization is carried out completely to the end, and here almost quanitative yields are obtained. According to the process of the invention, stable coagulate-free dispersions with high solid content can be polymerized. Preferred are dispersions with a solid content, desired for the many purposes of use, of 45 to 55% by weight. However, one can also achieve dispersions with a solid content of 60% by weight.

Many methods are possible for determining the monomer content during polymerization. Frequently one can control the monomer content in the polymerization autoclave by the reflux temperature. Also it is possible in many cases to derive the quantity of the not yet polymerized monomers from the pressure conditions. At any rate one can determine the monomer content or the polymerizate content analytically.

The polymerization process described is of decisive significance, particularly the pre-polymerization without the water-soluble components (a) and (b). Namely, if these components are introduced jointly or if they are polymerized proportionately with the applied and continuously added monomers, one obtains dispersions with rough to medium particles which are of low viscosity and whose films quickly become white-coated during water storage.

Contrary to this, dispersions produced in accordance with the polymerization process of the invention are surprisingly fine-particled. Moreover, they are stable against mechanical shearing stresses, such as occur during pumping and stirring of the paints. Also, the films made from them gradually get white-fogged only after prolonged water storage. In spite of a particle size of less than $0.2\mu$, preferably $0.07$ to $0.1\mu$, the dispersions have a high viscosity which is suitable for processing. Also, they are generally quite compatible with the customary pigments. Because of their excellent pigment binding capacity they can be used to advantage in many applications, particularly as brush-on paint binding agents. With them one can make highly-filled cheap indoor paints, wear-resistant outdoor paints, enamel paints and waterproof plastic polishes. One can also add to the dispersions of the invention other additives frequently used for paint systems like softeners, film-forming agents, wetting agents, defoaming agents, as well as thickening agents like cellulose derivatives. At the same time they can be used effectively as adhesives and paper paints. The parts and percentages shown in the examples are weight units.

EXAMPLE 1

Into a reaction vessel equipped with a stirrer, reflux condenser, dosaging device and nitrogen rinser, one places 350 parts water, 1.5 parts Mersolate K 30 (commercial product of the firm Bayer, Leverkusen), 20 parts nonylphenolpolyglycol ether with 23 ethylene oxide units, 1 part sodium-vinyl sulfonate, 0.4 part potassium persulfate as well as 50 parts of a mixture of 35 parts vinyl acetate and 15 parts 2-ethylhexylcarboxylic acid vinyl ester, and rinsed with nitrogen. The polymerization is started by heating while stirring. The monomers are polymerized under increasing temperature. When the temperature has risen to 80° C., a conversion of more than 80% has been achieved. Then, during the period of two more hours, 450 parts of a mixture of 315 parts vinyl acetate and 135 parts 2-ethylhexylacraboxylic acid vinyl ester and a solution of 4 parts acrylic acid and 4 parts acrylamide in 80 parts of water as well as 0.6 part potassium persulfate, dissolved in 70 parts of water, are added continuously in such manner that the reaction temperature does not fall below 75° C. The result of this is that not more than 20% of monomers are present in the reaction mixture. For final polymerization one heats to 85° C. for one hour, then cools while stirring and the pH value is set at 6.5 with ammonia. One obtains a very fine-particled (particle size $0.1\mu$), highly viscous dispersion. The viscosity, measured with a Brookfield viscosimeter RVT at 1 r.p.m., is 50,000 cps. The resulting solid content is 51.5%. The dispersion is resistant to shearing and is universally pigment-compatible. The stipple-free dispersion film, after storage in water for one hour, hardly shows any white fogging. The dispersion excells in high pigment binding capacity and good rubbing resistance.

The test for pigment compatibility was carried out in the following manner:

To 3 parts of a pigment paste of 2.5 parts pigment (titanium dioxide, chalk, china clay, lithopone, barium carbonate-barium sulfide, mix-pigment Elkadur, kaolin) and 0.5 part of a wetting agent solution containing 2.5% sodium metahexaphosphate and 0.5% ammonium polyacrylate one adds 2 parts of a 50% aqueous dispersion. The mixture is tested for freedom from coagulates, for flow properties and brushing properties. It is found that the dispersion is quite compatible with all conventional pigments.

Comparative Example 1

One proceeds as in Example 1, but proportionately with adding the monomers $\frac{1}{10}$ acrylic acid and $\frac{1}{10}$ acrylamide from the dosage. One obtains a rough-dispersed, low-viscous dispersion (1,000 cp.) whose film gets white-fogged within a few minutes when stored in water.

Comparative Example 2, as per DAS #1,265,988, Example 1

Into a reaction vessel as in Example 1 one places 415 parts water, 75 parts of a 10% solution of a copolymerizate of 80% acrylic acid, 10% acrylamide and 10% acrylic acid methyl ester, whose 5% solution in a Ford beaker with a 4 mm. nozzle at 20° C. has a runoff period of 35 sec., 6.75 parts of the sulphating product of an adduct of 25 mol ethylene oxide and 1 mol isooctyl phenol, 8.75 parts of an adduct of 25 mol ethylene oxide and 1 mol spermoil alcohol, 1.25 parts vinyl sodium sulphonic acid and 0.5 part methylvinyl carbinol. After rinsing with nitrogen and setting the pH value with ammonia at pH 6, one heats to 80° C. During 1½ hours one lets flow in uniformly a mixture of 350 parts vinyl acetate, 150 parts 2-ethylhexyl carboxylic acid vinyl ester and 0.5 part methylvinyl carbinol, as well as separately a solution of 3 parts potassium persulfate in 50 parts water at 80 to 83° C. Subsequently one post-polymerizes for a half hour at 85° C. One obtains a highly viscous, medium to rough-particled dispersion which in comparison with the dispersion produced in Example 1, because of its rougher particles, has a lower pigment binding capacity. When standing, the dispersion separates into two phases, forming a serum. The film gets white-fogged within minutes during storage in water.

Comparative Example 3, as per DAS #1,265,988, Example 6

A vinylpropionate-, n-butylacrylate copolymer dispersion produced by presenting a protective colloid of 50% ammonium acrylate, 30% acrylamide, 10% acrylnitrile and 10% acrylic acid methyl ester also is medium to rough dispersed. The film is fogged white in water within minutes.

EXAMPLE 2

Into a reaction vessel as per Example 1, one places 350 parts of water, 2 parts Mersolate K 30, 20 parts isotridecylalcohol polyglycol ether with 15 ethylene oxide units, 1 part sodium vinyl sulfonate, 0.4 part potassium persulfate as well as 50 parts of a mixture of 10 parts versatic acid vinyl ester (Veo Va 10), 10 parts 2-ethylhexyl-carboxylic acid vinyl ester and 30 parts vinyl acetate, rinses with nitrogen and polymerizes out up to more than 70% by heating, under stirring. The internal temperature reached 75–80° C. in the process. Then 450 more parts of a mixture of 90 parts versatic acid vinyl ester (Veo Va 10), 90 parts 2-ethylhexyl carboxylic acid vinyl ester and 270 parts vinyl acetate as well as a mixture of 4 parts acrylic acid and 2 parts acrylamide are added in such a manner that the free monomer concentration does not exceed 15% in the reaction medium. During the monomer dosaging one adds with another input 0.6 part potassium persulfate soluted in 100 parts of water. One obtains a very fine-particled (particle size 0.08$\mu$), highly viscous dispersion, which is mechanically stable and stable against pigments, and results in paints with good brushing qualities. The viscosity, measured in the Brookfield viscosimeter, at 1 r.p.m. is 70,000 cps. The dispersion film is stipple-free, highly glossy and does not get white-fogged even after being stored in water for four hours.

EXAMPLE 3

Into an autoclave with stirrer, dosaging devices, devices for nitrogen rinsing and for taking samples, and a pressure meter, one places 350 parts water, 3.0 parts tetrapropylenebenzene sulfonate, 8 parts nonylphenolpolyglycol ether with 10 mol ethylene oxide, 15 parts isooctylphenol ether with 25 ethylene oxide units, 0.3 part potassium persulfate and rinses with nitrogen. Then 15% of the monomer mixture of 150 parts vinyl chloride, 125 parts vinyl laurate and 225 parts vinyl acetate are added and heated to 65° C. under stirring. When the above has been completely polymerized, i.e. when the pressure has fallen to 0 atm. absolute pressure, the remaining 85% of the monomer mixture together with a mixture of 7 parts acrylic acid and 7 parts acrylamide in 80 parts water as well as a solution of 0.5 part potassium persulfate in 70 parts water are continuously dosed in such a manner that the monomer content in the reaction medium does not exceed 20%. The monomer content is determined continuously on the basis of pressure in accordance with a calibration curve which was determined by finding the monomer or solid content. After the end of dosaging the temperature of 65° C. is maintained until the pressure has fallen to 0 atm. absolute pressure. The pH value is set at 7 by adding ammonia. One obtains a fine-particle, highly viscous dispersion. The average particle size, determined in the electron microscope, is 0.09$\mu$. The dispersion is very well compatible with pigments. The film is free of stipples, has a high gloss and did not get fogged white after two hours storage in water.

Comparative Example 4

A starting substance made up as described in Example 3, but where 7 parts acrylic acid and 7 parts acrylamide solution were included, results in a rough-particle dispersion with high stipple content and low pigment binding capacity.

Comparative Example 5

A starting substance made up as described in Example 3, but where proportionately 15% of the acrylic acid and of the acrylamide were included, yields a low-viscous, medium to rough-particle dispersion, whose film gets white-fogged right away.

EXAMPLE 4

Into a reaction vessel as per Example 3 one places 350 parts water, 3.0 parts dodecylbenzene sulfonate, 8 parts nonylphenolpolyglycol ether with 10 ethylene oxide units, 15 parts nonylphenolpolyglycol ether with 25 ethylene oxide units, 0.4 part potassium persulfate and 1.5 parts sodium vinyl sulfonate, and rinses with nitrogen. Then one adds by dosages 10% of a monomer mixture of 250 parts vinyl chloride and 250 parts 2-ethylhexylvinyl ester, and heats to 65° C. while stirring. As soon as the monomers have been polymerized more than 70%, the remaining 90% of the monomer mixture together with a solution of 10 parts acrylamide, 8 parts methacrylic acid and 1.5 parts sodium vinyl sulfonate in 80 parts water as well as a solution of 0.5 part potassium persulfate in 70 parts water are continuously added in such a manner that the monomer content in the reaction medium does not exceed 20%. After ending the dosaging, it is post-polymerized by heating to 75° C. for two hours. One obtains a fine-particle, highly viscous dispersion with an average particle size of 0.1μ. The dispersion has a very high pigment binding capacity, is compatible with pigments in many ways, and its film shows a light white fogging only after a six-hour storage in water.

EXAMPLE 5

Into a reaction vessel as per Example 3 one places 350 parts of water, 1.5 parts Mersolate K 30, 25 parts nonylphenolpolyglycol ether with 23 ethylene oxide units, 0.5 part potassium persulfate, 1.5 parts sodium vinyl sulfonate, 2 parts of 0.1% palladiumsols, and rinses with nitrogen. Then 10% of a mixture of 175 parts vinyl chloride and 325 parts vinyl acetate are added by dosaging and heated to 45° C. under stirring, after pressing on at 40 atm. absolute pressure ethylene, polymerization is started by pressing on 2 atm. absolute pressure hydrogen and one starts the continuous additive dosaging of a solution of 1.5 parts potassium persulfate, 1.5 parts sodium vinyl sulfonate in 80 ml. water which are added during 8 hours. As soon as the polymer content (determined by drawing samples) has risen to 15%, the remaining 90% of the vinyl chloride-vinyl acetate mixture together with a mixture of 7 parts acrylamide and 3 parts acrylic acid in 70 parts water are continuously added in such a manner that the monomer content does not exceed 15%. The ethylene pressure is maintained at 40 atm. absolute until the end of the dosaging. Thereafter the temperature is maintained at 45° C. for another 4 hours, then the pH value is buffered down to 7 with ammonia. One obtains a fine-particle, highly viscous dispersion with a versatile pigment compatability. The viscosity, measured with a Brookfield viscosimeter RTV at 1 r.p.m., is 80,000 cps. The average particle size is 0.07μ. There is hardly any white fogging on the film after af our-hour storage in water.

Comparative Example 6

A comparative starting substance made as per Example 5, but where the remaining 90% of the vinyl chloride-vinyl acetate mixture are added by dosaging so fast that the monomers reach a percentage of 35% in the reaction mixture, resulted in a low-viscous dispersion with a considerable percentage of particles of 0.8μ. The viscosity was 1,000 cps. The dispersion film was fogged white immediately in water.

Comparative Example 7

A comparative starting substance as per Example 5, but where instead of the mixture of acrylic acid-acrylamide, a solution of 10 parts acrylamide in 70 parts water was added, results in a highly viscous, fine-particle dispersion which is no longer stable against mechanical stresses as they occur during admixture of various pigments and during pumping, as well as toward various pigments.

Comparative Example 8

A comparative starting substance made as per Example 5, where instead of the mixture acrylic acid-acrylamide a solution of 10 parts acrylic acid in 70 parts water was added by dosaging, results in a low-viscous, medium dispersed dispersion with lower pigment binding capacity than that produced in Example 5; the films get fogged white in a few minutes when stored in water.

The invention claimed is:

1. Process for manufacturing aqueous, highly viscous and stable polyvinyl ester dispersions with particle sizes from 0.03 to 0.2μ by radical polymerization in the aqueous phase of monomeric vinyl esters of straight-chained or branched carboxylic acids with 2 to 18 carbon atoms, at a temperature of 10 to 100° C., which comprises polymerizing 5 to 25 weight percent of the total monomer quantity in an emulsifier solution up to at least 70 weight percent of the conversion of the available monomer, and then adding to said emulsifier solution the remaining monomer quantity and a mixture of 0.1 to 2 weight percent of a substance selected from the group consisting of acryl-, methacryl-, and crotonic acid and also 0.1 to 2 weight percent of their amides, each time referred to the total weight of the polyvinyl ester dispersion, the said addition to said emulsifier solution being added continuously in such manner that the monomer content of the reaction mixture does not exceed 25 weight percent referred to the reaction mixture.

2. Process according to claim 1, in which up to 1 weight percent, referred to the polyvinyl ester dispersion, alkali salts of vinyl sulfonic acid are introduced into the emulsifier solution, in one or more doses, for polymerization.

3. Process according to claim 1, in which the monomers employed are 30 to 80 weight percent vinyl acetate, 10 to 40 weight percent vinyl chloride and 5 to 30 weight percent ethylene, each time referred to the total quantity of monomers.

4. Process according to claim 1, in which the monomers employed are selected from the group consisting of 40 to 80 weight percent vinyl ester and 20 to 60 weight percent vinyl chloride, each time referred to the total quantity of monomers.

5. Process according to claim 1, in which the quantity of acryl-, methacryl- and crotonic acids and their amides, referred to the polyvinyl ester dispersion, does not exceed 3%.

References Cited

UNITED STATES PATENTS

| 2,300,920 | 11/1942 | Heuer | 260—32 |
| 2,767,153 | 10/1956 | Sutton | 260—29.6 |
| 2,962,465 | 11/1960 | Lindstrom et al. | 260—29.6 |
| 3,164,562 | 1/1965 | Breed | 260—29.6 |
| 3,231,534 | 1/1966 | Blades et al. | 260—29.6 |
| 3,296,169 | 1/1967 | Corey | 260—29.6 |
| 3,296,175 | 1/1967 | Fantl et al. | 260—29.6 |
| 3,296,176 | 1/1967 | Fantl | 260—29.6 |
| 3,318,830 | 5/1967 | Condon et al. | 260—29.6 |

FOREIGN PATENTS

| 1,211,395 | 2/1966 | Germany. |
| 1,178,597 | 9/1964 | Germany. |

OTHER REFERENCES

Goebel et al., Kunststoffe 55, 329–32(1965).

MELVIN GOLDSTEIN, Primary Examiner

U.S. Cl. X.R.

260—80.73